Nov. 13, 1928.
C. E. FULLER
1,691,881
OFF-BEARING CONVEYER
Filed March 18, 1927
2 Sheets-Sheet 1
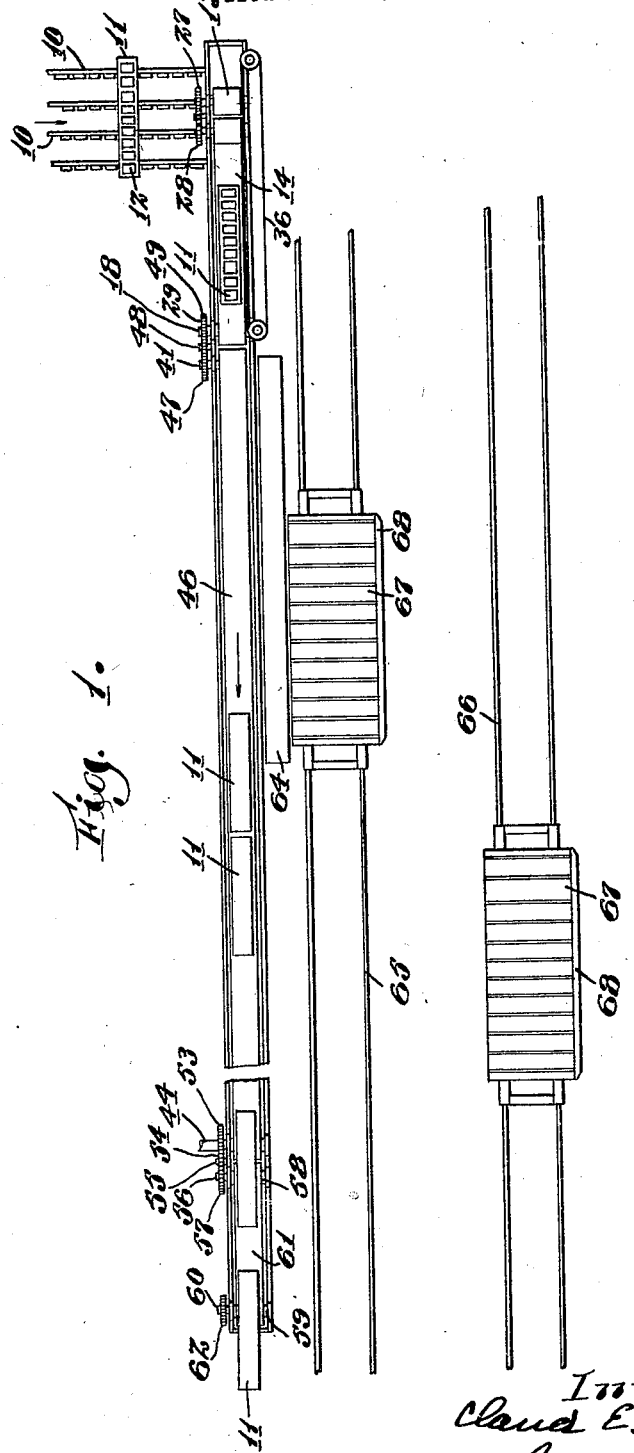
Inventor
Claud E. Fuller
by James R. Hodder
Attorney

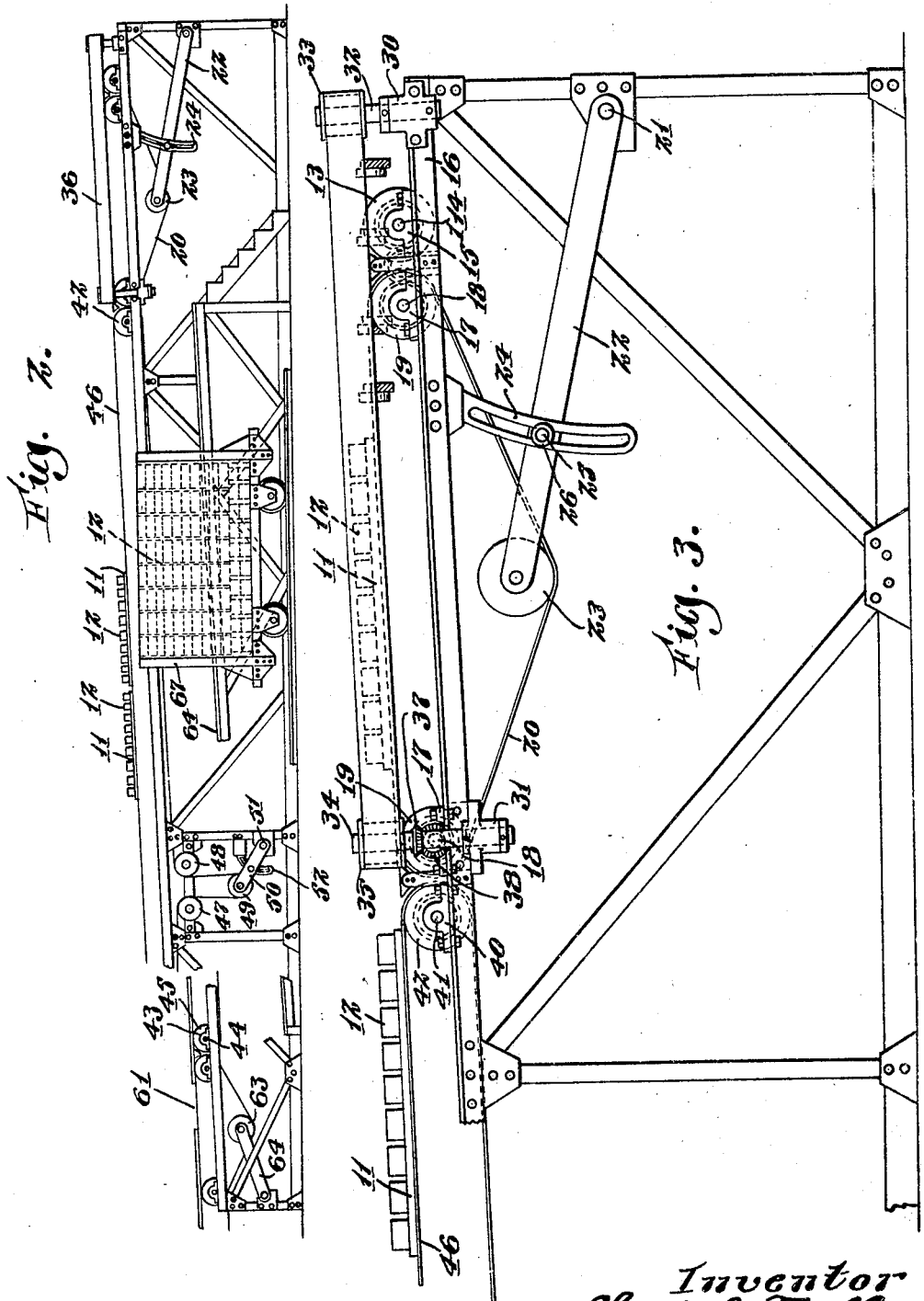

Patented Nov. 13, 1928.

1,691,881

UNITED STATES PATENT OFFICE.

CLAUD E. FULLER, OF NEW YORK, N. Y., ASSIGNOR TO NEW YORK BRICK HANDLING CORPORATION, OF NEW YORK, N. Y., A CORPORATION OF NEW YORK.

OFF-BEARING CONVEYER.

Application filed March 18, 1927. Serial No. 176,493.

My present invention relates to off bearing conveyers and more particularly to an improved conveyer for use in connection with an improved system of handling brick during the process of manufacture.

In my copending application, Serial No. 227,818 filed October 21, 1927, I have described and claimed an improved system for handling brick, and in practicing this improved system, have devised a number of mechanisms whereby the system may be more economically and expeditiously practiced. One of such mechanisms is an improved off bearing conveyer that forms the subject matter of the present invention and in it is provided a means for automatically changing the direction of travel of a plurality of pallets in succession, changing the speed of the moving pallets in any manner desired in order, for example, to give time enough to remove the bricks from the pallets while yet preventing succeeding pallets from overriding the preceding pallets and afterwards changing the speed of the empty pallets in order that the same may be successfully returned to the brick-making machine.

In connection with this mechanism I utilize means whereby the brick, as they are taken from the pallets by the belt boys, are loaded onto unit cars in unit brick formation for subsequent mechanical handling and building into a kiln, and the conveyer and the unit cars are so arranged relative to a platform that a minimum of effort is required on the part of the belt boys in loading the unit cars with units of brick, and regardless of the number of courses of brick that may have been placed on the car.

The principal object of my invention, therefore, is an improved off bearing conveyer.

Another object of my invention is an improved apparatus for facilitating the loading of unit cars.

Other objects and novel features of the construction and arrangement of parts comprising the device will appear as the description of the invention progresses.

In the accompanying drawings illustrating a preferred embodiment of my invention, Fig. 1 is a plan view;

Fig. 2 is a side elevation of Fig. 1, and

Fig. 3 is an enlarged side elevation of the right-hand end of Fig. 2.

Referring to the drawings, 10 designates a gravity conveyer that extends over and is associated with a conveyer system from a brick drier and passing over the gravity conveyer are pallets 11 each provided with a number of brick 12 on the upper surface thereof.

These pallets 11 are fed to the gravity conveyer at the rate of approximately fifty pallets per minute and the rate of travel of the pallets over the gravity conveyer is approximately one hundred ten feet per minute, which, with the assumed number of pallets fed, allows for a spacing of $16\frac{4}{10}''$ between pallets. The above dimensions, and any other dimensions referred to throughout this specification, are approximate only and are used for the purpose of illustrating the working of the apparatus and the practicing of the system. At the delivery end of the gravity conveyer 10 and extending transversely thereof, is a landing roll 13 and a take-off belt 14, the upper reach of the belt 14 being or lying substantially in the plane that passes through the landing roll, as will be clearly seen from an inspection of Fig. 3. The landing roll 13 is secured to a shaft 114 that is rotatably mounted in spaced bearings 15. The bearings 15 are secured to the upper surface of a framework constructed of structural elements 16. Also secured to the framework are pairs of alined bearings 17, in each pair of which is rotatably mounted a shaft 18. The shafts 18 lie parallel to the shaft 114, above referred to. Secured to the shafts 18 between the bearings 17 are rolls 19 and over the rolls 19 passes the endless conveyer or off bearing belt 20. Pivotally mounted on a shaft 21 secured to the framework is a frame 22 that carries at its front end a rotatably mounted roll 23, which, as will be obvious from an inspection of Fig. 3, engages with the off bearing belt 20 and acts to tension the upper reach hereof. Secured to the framework is a slotted arcuate member 24, through the slot of which passes a bolt 25. The bolt 25 is secured to the framework 22 and has screwed on its outer end a hand nut 26 and by means of which the framework 22 and, therefore, the roll 23 may be held in any desired adjusted position. On one end of the shaft 114 is secured a gear 27 which meshes with and is driven by a gear 28 secured to the adjacent end of the shaft 18 nearest to the shaft 114. Secured to the other shaft 18 is a gear 29, as will be hereinafter explained. Secured to the framework and spaced apart from each other are vertical bearings 30 and 31 respectively, and in the bearing 30 is rotatably mounted a shaft 32 carrying adjacent its upper end a pulley 33. Rotatably mounted in the bearing 31 parallel to the shaft 32 is a shaft 34 and secured to the shaft 34 adjacent its upper end is a pulley 35 in alinement with the pulley 33. Over the pulleys 33 and 35 runs an endless guard belt 36. Secured to the shaft 34 is a bevel pinion 37 which meshes with and is driven by a bevel gear 38, secured to the shaft 34. The inner reach of the guard belt 36, or that portion adjacent the landing roll 13 and the take-off belt 14, runs in the direction of the arrow shown or in the direction of movement of the upper reach of the take-off belt 14.

Mounted on the framework 16 adjacent the shaft 18 carrying the bevel gear 38 are alined bearings 40, in which is rotatably mounted a shaft 41, having secured thereto a roller 42, the roller 42 lying parallel to the roll 19. Also mounted on the framework and at any convenient or desired distance from the alined bearings 40 are alined bearings 43, and in the bearings 43 is rotatably mounted a shaft 44 having secured thereto a roller 45. Passing over the rolls 42 and 45 is an off bearing belt 46 and this off bearing belt 46 also passes over idler rolls 147 and 48 mounted in suitable bearings on the framework and also under a tension roll 49, rotatably mounted in the framework 50, pivotally mounted at 51 on the first said framework. Associated with the framework 50 is an arcuate slotted member 52 and by means of which the framework 50 may be adjustably secured on its pivot 51. Secured to one end of the shaft 41 is a gear 47 which drives the gear 29 through an idler gear 48 rotatably mounted on a stub shaft 49 secured to the framework.

Secured to the shaft 44 is a gear 53 which meshes with and is driven by an idler gear 54 rotatably mounted on a shaft 55 secured to the framework. Also alined in bearings secured to the framework and parallel to the shafts 44 and 55, is a shaft 56 that has secured thereto a gear 57, which meshes with the idler gear 54 and drives both the idler gear and the gear 53. Also secured to the shaft 56 is a roll 58 which is in alinement with a roll 59 secured to a shaft 60. Rotatably mounted in suitable bearings secured to the frame and over the rolls 58 and 59 runs a discharge belt 61. Secured to the shaft 60 is a gear 62 and by means of which the shaft 60 may be connected to any suitable source of power for driving the entire mechanism thus far described. Associated with the discharge belt 61 is a tension roll 63 carried by a frame 64 pivotally and adjustably mounted on the frame work.

The various trains of gears described and referred to are so proportioned relative to the speed of the shaft 60 and the gear 62 attached thereto with the various belts are driven at different speeds. For example, the conveyer 10 has delivered to it the pallets 11, each containing nine brick No. 12, and the pallets have been assumed to have been delivered at the rate of fifty pallets per minute and with this delivery, the pallets are spaced 16 4/10" apart and thus the pallets will travel at approximately 110 ft. per minute. From an inspection of Fig. 1, it will be seen that the pallets 11 are arranged transversely to the length of the conveyer 10 and, therefore, will be delivered to the landing roll 13 and take off belt 14 so as to lie parallel to the length of such take off belt. The speed of the take off belt 14 and the landing roll 13 must be such as to move the pallets 11 longitudinally to allow succeeding pallets to be moved into position in regard to the landing roll and take off belt without interference, and I find that this can be done if the speed of the take off belt 14 and the surface speed of the landing roll 13 is approximately 272 ft. per minute and, therefore, the trains of gearing 47, 29, 28 and 27 is so proportioned as to produce these speeds in the take off belt 14 and landing roll 13. This speed provides for a space of approximately 26" between the pallets 11 and is ample for the purpose desired. The guard belt 36 against which the pallets 11 are or may be brought is so connected to the drive shaft 18 that the speed of such guard belt will be approximately equal to the speed of the take off belt 14. From the take off belt 14 the pallets 11 are fed onto the off bearing belt 46 which is so geared as to be driven at a speed of approximately 167 ft. per minute to allow for a spacing between pallets of approximately one inch. The off bearing belt has a function which will be referred to later, it being only sufficient to state at this point that by the time the various pallets 11 have reached the end of the off bearing belt 46, all the bricks thereon will have been removed and the now empty pallets are moved onto the discharge belt 61 which is so geared as to have a surface speed of approximately 214 ft. per minute, which allows a spacing between pallets of approximately 12" and renders it possible to feed the pallets 11 over various conveyers or other mechanisms and back to the brick machine where they are again loaded with brick 12.

By referring to the drawings, and particularly Figs. 2 and 3, it will be noted that the various belts 14, 46 and 61 lie in a plane that makes an angle to the horizontal, and arranged alongside of the off bearing belt 46, is a workman's platform 64, which is given a pitch similar to the pitch of the upper reach of the off bearing belt 64 but with the upper surface of the platform 64 considerably below the upper reach of such off bearing belt. Lying parallel to the framework above described and parallel to the off bearing belt and the workman's platform 64 is a track 65 and parallel to such track, but further removed from the framework, is a similar track 66 and on these tracks may run unit cars 67, it being noted at this point that such unit cars are provided on their outer side with a wall or closure 68 and against which the bricks 12 may be piled. The heights of the platform of the unit car 67, workman's platform 64 and the upper reach of the off bearing belt 46 are so proportioned that as the loaded pallets 11 move from right to left, as indicated in the figures, and the unit car 67 moving from left to right, as shown in the figures, that the various belt boys arranged along the platform 64 may take the brick 12 off such pallets 11 and place them in hacked formation on the unit cars 67 with a minimum of effort regardless of the height of the courses of brick in a unit car. That is, if the unit car 67 is assumed to be at the left hand end of the off bearing belt 46, the belt boys may load the brick 12 on the pallets 11 onto the platform of the unit car, which in this position is substantially level with the off bearing belt 46, and as the courses of brick on the unit car 67 are built up, such unit car will be moved to the right so that the level on which the bricks 12 are to be built will be substantially equal regardless of the position of such unit car with respect to the off bearing belt.

Having thus described my invention, what I claim as new is:

In an improved conveying apparatus, the combination with a feeding conveyer, of a take off belt associated therewith, said take off belt being inclined and with a portion adjacent the feeding conveyer higher than the delivery end thereof and an elevated platform arranged adjacent and parallel to the take off belt, said elevated platform lying parallel to the upper reach of the take off belt.

In testimony whereof, I have signed my name to this specification.

CLAUD E. FULLER.